May 30, 1939. H. ROSENBERG 2,160,087
METHOD AND MACHINE FOR MAKING CAPPED NUT BLANKS
Filed Aug. 13, 1937. 4 Sheets-Sheet 1
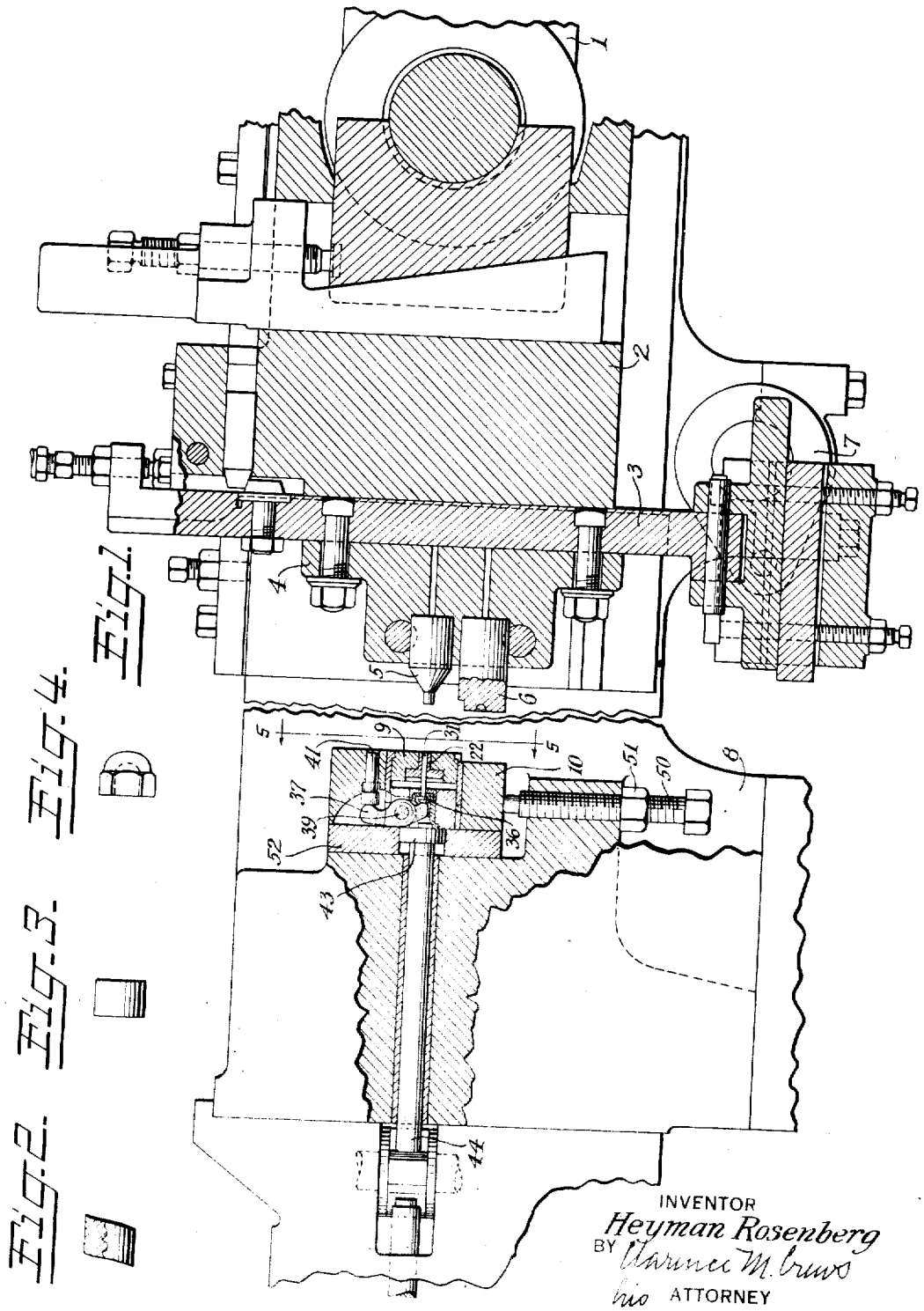
INVENTOR
Heyman Rosenberg
BY
his ATTORNEY May 30, 1939. H. ROSENBERG 2,160,087
METHOD AND MACHINE FOR MAKING CAPPED NUT BLANKS
Filed Aug. 13, 1937 4 Sheets-Sheet 2
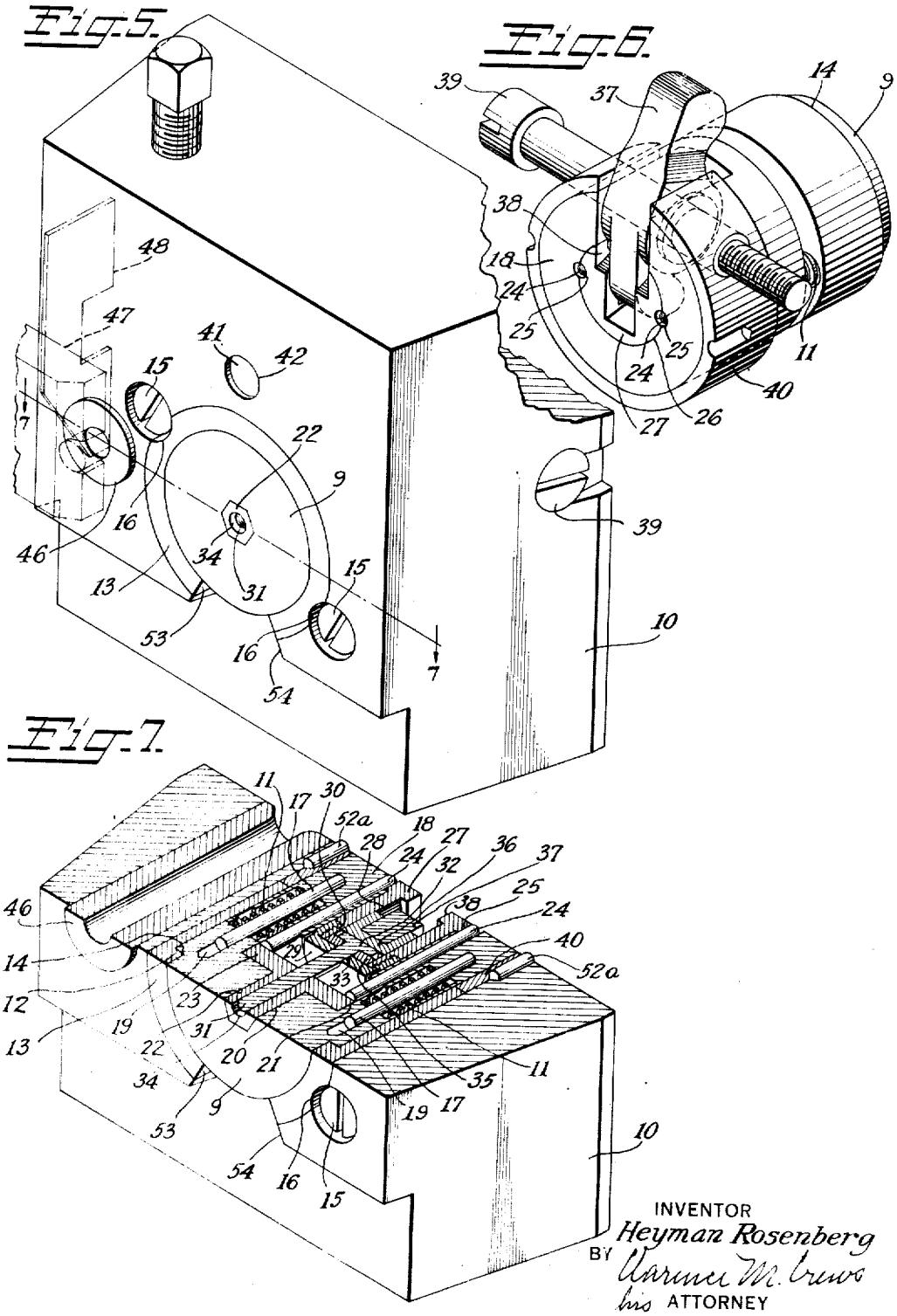

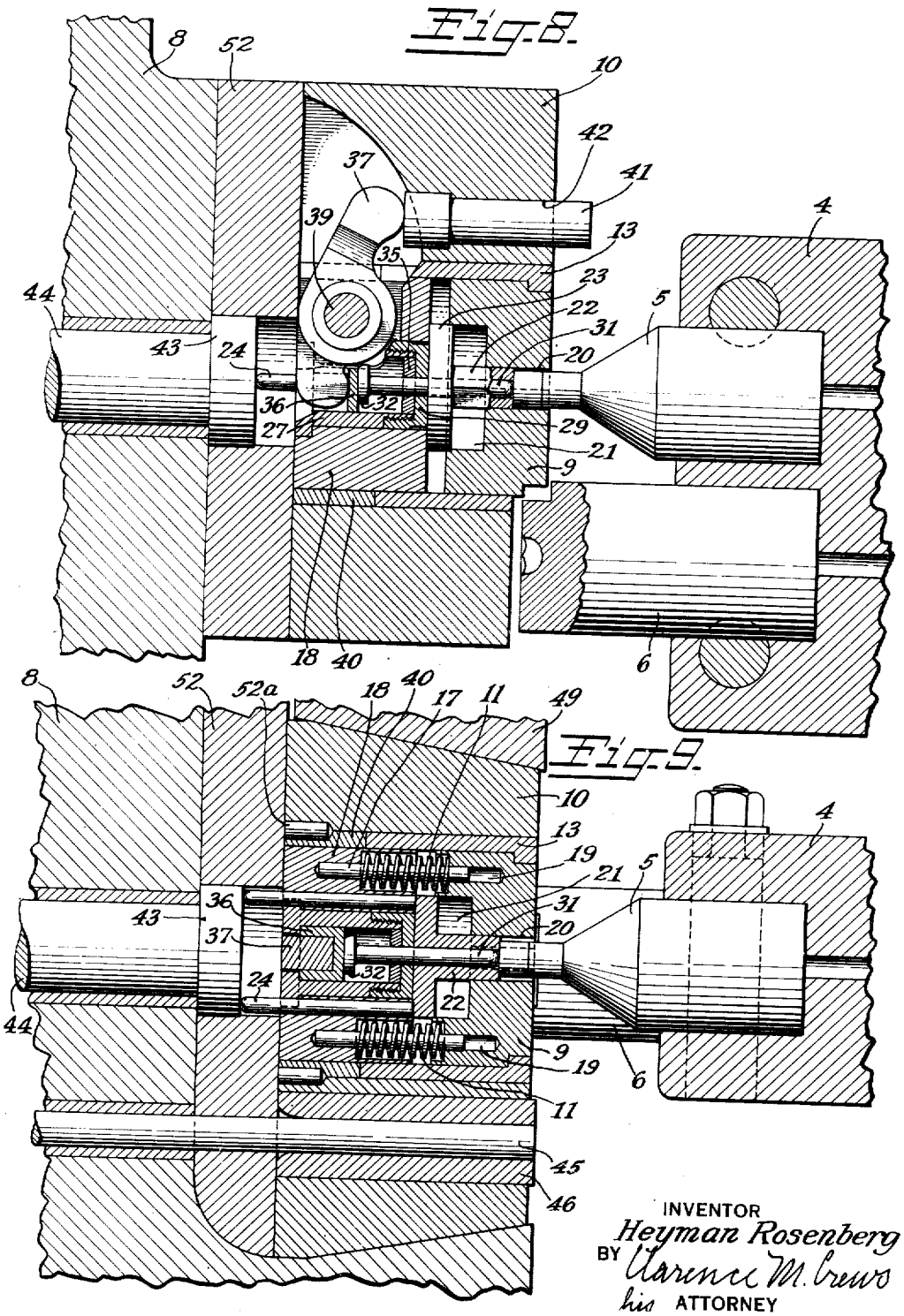

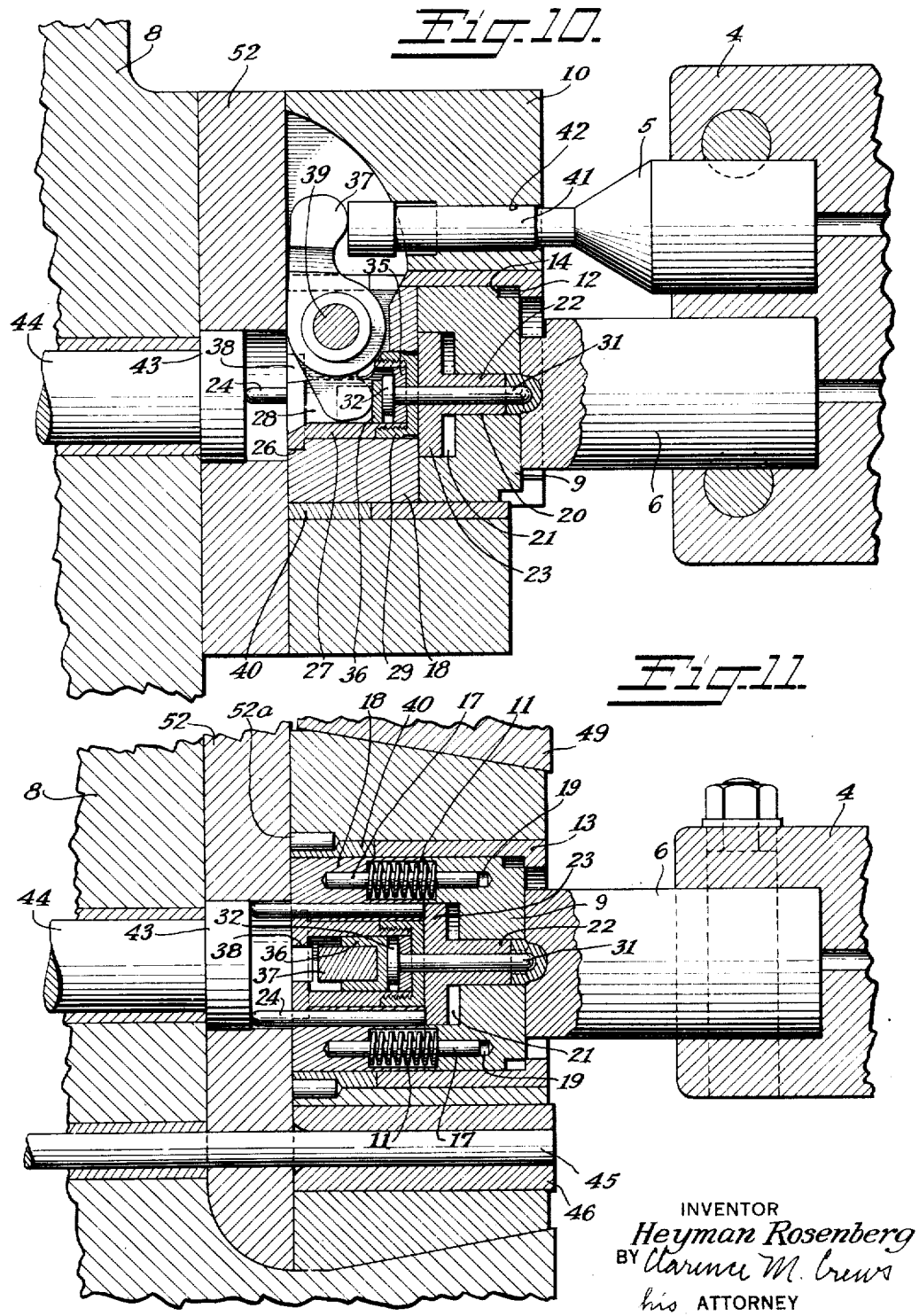

Patented May 30, 1939

2,160,087

UNITED STATES PATENT OFFICE 2,160,087

METHOD AND MACHINE FOR MAKING CAPPED NUT BLANKS

Heyman Rosenberg, New York, N. Y.

Application August 13, 1937, Serial No. 158,838

15 Claims. (Cl. 10—76)

This invention relates to the manufacture of capped nuts and has to do both with the devising of an improved method for the manufacture of capped nuts and with the provision of an improved apparatus for effecting such manufacture.

The present invention is in the nature of an improvement upon the inventions disclosed and claimed in my pending application Serial No. 22,593, filed May 21, 1935, for Art of producing capped nut blanks, now Patent No. 2,090,641, and in my pending applications Serial No. 148,895, filed June 18, 1937, for Machine for making capped nut blanks (now Patent No. 2,120,649), and Serial No. 148,897, filed June 18, 1937, for Machine for making capped nuts from thimbles (now Patent No. 2,120,650).

In accordance with the practice disclosed in my pending applications referred to, two machines known as double stroke standard headers are successively employed. In the first machine a slug of metal is cut from a piece of wire stock and formed into a thimble-like shell or blank. The thimble-like blanks which form the product of the first machine are then annealed and fed to the second machine which acts to die-form the thimble-like blanks to convert them into blanks having the proper external and internal configuration of finished, but unthreaded, capped nuts.

It is an object of the present invention to provide a single machine capable of feeding wire stock and of cutting slugs of measured length from the stock, and of then directly die-forming the slugs to convert them into finished, but unthreaded, capped nuts.

It is a further object of the invention to provide a machine constructed and organized to form finished, but unthreaded, capped nuts rapidly and effectively, and in an automatic manner, from wire stock fed into the machine, with substantially no other attention or supervision than the occasional placing of a fresh reel of wire stock in position to be fed to the operating instrumentalities of the machine.

To these ends, a very advantageous and practical form of machine embodying the invention desirably consists of a double stroke standard header embodying instrumentalities enabling the machine rapidly and automatically to convert a slug of metal into a finished, but unthreaded, capped nut at a single operation. The machine desirably includes means for intermittently feeding wire from a wire reel through steps of measured length, and mechanism for severing a slug of metal from the leading end of the wire after each wire feeding step and for transferring the severed slug to alignment with a floatingly mounted matrix die. A double stroke reciprocating plunger, operating in timed relation to the slug severing and transferring mechanism, carries two die members for cooperating with the matrix die at alternate forward strokes of the plunger. The first or preliminary die thrusts the slug into the matrix die, pressing it into the die with sufficient force to square the ends of the slug and to work the metal into an excited state.

The second plunger die, which is the dome forming or finishing die, has a cavity or recess in its face, the mouth portion of the cavity being of the same size and shape as the bore of the matrix die, and the interior portion of the cavity being dome-shaped. A bore-forming plunger is mounted to extend axially into the matrix die toward the plunger die from the end opposite the plunger die. A sleeve is interposed between the matrix die and the bore forming plunger and contains the bore forming plunger within its bore at the first or preliminary stroke of the plunger.

At the second forming stroke the finishing die moves into engagement with the face of the floatingly mounted matrix die, forcing the matrix die to retreat before it. At this stroke the preliminary plunger die strikes against a thrust pin which, through a rocking lever, causes the boreforming plunger to be projected beyond the face of the positively supported sleeve and to penetrate the interior of the blank. Thus the metal of the blank is displaced outward by penetration of the bore-forming plunger at the same time that the blank is longitudinally compressed between the finishing die and the face of the sleeve. The longitudinal compressive force applied to the blank, together with the displacement of the bore metal, causes the skirt portion of the blank to be spread and thickened laterally to fill the entire forming space remaining at the end of the forming stroke of the finishing die. Surplus metal, if any, is squeezed out to form a thin fin between the opposed faces of the matrix die and the finishing die.

It will be seen that the described operations involve the formation of a capped nut blank from a slug of metal according to a novel method. The method is characterized by the fact that the slug or blank is inserted into a solid surrounding die of a desired non-cylindrical cross-sectional shape and is there die-formed to its final contour by compressing it longitudinally between relatively unyielding die members, and simultaneously driving a bore-forming plunger into the blank.

Other objects and advantages will hereinafter appear.

In the drawings forming part of this specification and disclosing a practical and efficient illustrative apparatus for carrying out the objects of the invention, Figure 1 is a fragmentary view in side elevation, partly in section and partly broken away, illustrating a standard double stroke header equipped with instrumentalities for converting wire stock into capped nut blanks;

Figure 2 is a detail view, partly broken away, illustrating a slug of metal as it appears when first severed from the wire stock;

Figure 3 is a detail view illustrating the slug of Figure 2 after the ends of the slug have been squared;

Figure 4 is a view in side elevation of a finished capped nut blank forming the product of the disclosed machine and method;

Figure 5 is a fragmentary, perspective view illustrating the stationary die block of the machine and certain of the parts carried by said die block; the view being taken in the direction of the arrows 5, 5 of Figure 1;

Figure 6 is a rear perspective view illustrating particularly the matrix die and the operating means for the bore-forming plunger or die;

Figure 7 is a perspective, sectional view, the section being taken on the line 7—7 of Figure 5 looking in the direction of the arrows;

Figure 8 is a fragmentary, vertical, sectional view showing the die members in the positions occupied by them at the conclusion of the preliminary stroke of the plunger;

Figure 9 is a fragmentary, horizontal, sectional view showing the parts at the same stage illustrated in Figure 8;

Figure 10 is a fragmentary, vertical, sectional view showing the die members and associated parts in the positions occupied by them at the conclusion of the finishing stroke of the plunger; and Figure 11 is a fragmentary, horizontal, sectional view showing the parts at the same stage illustrated in Figure 10.

As has been indicated above, the illustrative machine is a standard header in which instrumentalities have been embodied for enabling it to convert wire stock into finished, but unthreaded, capped nut blanks.

It is, of course, well understood in the industry that a header is a machine for forging enlargements on the ends of rod or wire blanks in the course of manufacture of nails, screws, bolts, and like fasteners. One of the earlier and simpler forms of header is disclosed more or less diagrammatically in the United States patent to T. Ferry, No. 1,069,659, dated August 5, 1913. The header shown in the Ferry patent is of the double stroke type, that is to say, a forming or matrix die is located to receive material to be treated by two plunger dies, one of which is caused to approach and act upon the material at one stroke of the machine, and then to shift out of line while the other shifts into line and acts on the material during the next stroke. Headers have become somewhat more complicated and more efficient than the illustration in the patent just mentioned, but the principle generally remains the same in the two stroke headers. An illustration of a modern and efficient header is found in the product now being marketed by the Waterbury Farrel Foundry & Machine Company of Waterbury, Connecticut, and the present machine is well adapted to be exemplified in a machine of that type, and especially of the type popularly referred to as a solid die, double stroke, high speed crank header. Parts of this header are disclosed in the patent to C. O. Petitjean, No. 1,478,356, dated December 18, 1923. Parts commonly known and popularly used on such headers are in part omitted and in part shown in the accompanying drawings, so much only being illustrated as is adapted for facilitating disclosure of the present invention. Detailed description of parts that are thus commonly known and are not directly modified by the present invention is omitted as not needed.

The illustrative header is provided with the usual pitman 1, connected to impart the requisite thrusts to a die block 2. A plunger slide 3 is carried by the die block 2 in position to slide vertically thereon, that is, across the rectilinear, horizontal path of reciprocation of the die block 2 while being carried by the die block and receiving thrusts therefrom. A die carrier 4 is mounted on the plunger slide 3 and carries a preliminary die 5 and a finishing die 6 which are spaced vertically apart, the former above the latter.

Appropriate apparatus, such as a crank 7 and its connected parts, impart timed vertical shifting movement to the plunger slide 3 to cause the preliminary die 5 to operate and then to move up out of line with the blank, and the dome forming or finishing die 6 then to operate. The parts referred to are appropriately mounted on a suitable bed or framework 8 having an internal space accommodating the preliminary die 5 and the plunger die 6 for movement toward and from a cooperating, opposed matrix die 9. The matrix die is of the type commonly known as "floating" since it is mounted in a stationary die block 10 with capacity to yield in response to the thrust of the finishing die 6.

The die 9 is stressed outward, that is, toward the die carrier 4, by appropriate springs 11, 11, and is held against movement outward beyond the face of the die block 10 by overlapping shoulders at the outer end of the matrix die such as a shoulder 12 formed on a sleeve 13 which surrounds the matrix die and a shoulder 14 formed on the matrix die. The sleeve 13 fits into a cylindrical bore of the die block and is held against removal and against rotary movement by the heads of screws 15, the screws being threaded into the die block and having their heads disposed to fit into arcuate rabbets 16 formed in outer marginal portions of the forward end of the sleeve. Guiding pins 17 extend outward from a base block 18 into sockets or bores 19 formed in the die 9.

The die 9 is provided with a longitudinal axial bore 20 which may be of any desired non-cylindrical shape in cross-section, for example, of regular hexagonal shape. To the rear of the bore 20 the die is provided with an enlarged cylindrical recess 21. A knockout sleeve 22 is arranged in the bore 20 and is provided with a base flange 23 which fits within the recess 21. The knockout sleeve 22 corresponds in cross-sectional shape with the bore 20 and has a snug sliding fit therein. The flange 23 limits outward movement of the knockout sleeve relative to the matrix die to a position in which the outer or forward end of the sleeve is substantially flush with the face of the matrix die.

The knockout sleeve is adapted to be thrust forward at the appropriate time in the cycle to eject a finished capped nut blank by means of knockout pins 24 which extend rearward through the base block and through notches or grooves 25 formed in an external flange 26 at the rear end of a guide bushing 27. The guide bushing 27 fits into a bore formed in the base block, having a driving fit therewith. The bore is enlarged at the rear end of the base block to accommodate the flange 26.

The guide bushing 27 is formed with an internal cylindrical recess or bore 28 and is closed at its forward end by a guide bushing cap 29 which is screwed into a reduced threaded forward end portion 30 of the bushing. A bore-forming plunger 31 has a base flange 32 received in the bore of the bushing, and the plunger proper extends forward through a bore 33 formed centrally in the bushing cap. The bore-forming plunger is received in a central bore 34 formed in the knockout sleeve and is adapted to be projected forward beyond the face of the knockout sleeve 22, as seen best in Figures 10 and 11, for forming the bore in the blank. A guide washer 35 surrounds the bore-forming plunger 31 within the bore of the guide bushing 27 and has a snug sliding fit with the bore of the bushing.

The bore-forming plunger is actuated by a piston or shoe 36 which fits the bore of the guide bushing. The piston or shoe 36 embraces the lower end of a bore plunger actuating lever 37, which extends downward into the guide bushing through a notch 38 formed in the rear end and the upper side of the bushing. The bore plunger actuating lever 37 is journaled upon a pivot screw 39 which extends horizontally into the die block 10 from one side thereof, passes through the base block 18 and through a rear sleeve 40 which surrounds the base block and which has its reduced inner end threaded into the die block. The upper end of the bore plunger actuating lever stands in the path of a thrust pin 41 which extends forward through a bore 42 beyond the face of the die block 10 and into position to be struck and thrust rearward by the preliminary die at the second or finishing stroke of the plunger slide 3.

As the pin 41 is thrust rearward it rocks the lever 37 about its pivot from the position shown in Figure 8 to that shown in Figure 10, with the result that the bore-forming plunger is thrust forward from the position shown in Figures 8 and 9 to the position shown in Figures 10 and 11.

During the forming operation the knockout sleeve is unyieldingly supported in a retracted position by the base block 18 which, in turn, is unyieldingly supported by a backing plate 52. (Figs. 9 and 11). The matrix die is initially supported at its extreme forward limit of movement by the springs 11. The finishing die is unyieldingly forced against the face of the matrix die and compels the matrix die to retreat before it. At the same time the preliminary die, through the pin 41 and the lever 37, forces the bore-forming plunger unyieldingly forward beyond the forward face of the knockout sleeve. Thus the finishing die and the knockout sleeve apply unyielding pressure in opposite directions against the blank to form the bore and the dome, and to compel the blank metal to be displaced outwardly. While the matrix die is free to yield longitudinally it unyieldingly resists and limits expansion of the skirt portion of the blank so that the metal forced outward by the compressive force and by the driving in of the bore-forming plunger is compelled to assume an external contour corresponding to the shape of the bore of the matrix die.

The slug of metal is thus converted from a mere slug to a finished capped nut blank at a single operation. As the finishing die retreats the matrix die is thrust forward by the springs 11 to its initial position as seen in Figures 8 and 9, and at the same time the knockout rod is thrust forward and acts through the knockout pins 24 to thrust the knockout sleeve to a position like that illustrated in Figure 7, to eject the finished blank from the matrix die. The knockout pins are thrust forward at the appropriate time by the head 43 of a knockout thrust rod 44.

The plunger slide then carries the dies 5 and 6 downward to align the die 5 with the matrix die preparatory to the next preliminary stroke. In the meantime the wire 45 has been advanced a measured distance beyond the face of a cut-off die 46, and it is now cut off by a knife 47 and carried by the knife 47 and the usual fiddle bow 48 into register with the bore in the matrix die. At the next forward stroke of the die block 2, the preliminary die 5 thrusts the severed slug into the bore of the matrix die as seen in Figures 8 and 9, thereby causing the knockout sleeve, the bore-forming plunger, the bore plunger actuating lever, and the thrust pin 41 to be restored to the positions illustrated in Figures 8 and 9. The pressure exerted upon the slug squares the ends of the slug and may also serve to swell the diameter of the slug somewhat, to cause the slug to engage the matrix die bore symmetrically, so that the slug is accurately centered by the matrix die.

The die carrier 4 is then retracted, moved upward to register the dome forming or finishing die 6 with the bore of the matrix die, and projected forward to cause the slug to be converted into a finished capped nut blank in the manner already described.

The die block 10 is dove-tailed into the frame and is secured in place by means of a wedge 49 (Figs. 9 and 11). The die block 10 rests upon a set screw 50 which is threaded through a portion of the machine frame 8 against the die block and locked in place by a lock nut 51. The set screw 50 not only acts as a stop, but also allows for any vertical adjustment of the die block which may be required. The die block 10, the base block 18, and the end sleeve 40 are positively supported against rearward movement by means of a backing plate 52 which is secured between the machine frame 8 and the parts referred to.

The end sleeve 40 is locked against rotary movement by pins 52a.

The retaining sleeve 13 is notched at 53 and the die block 10 at 54, to accommodate the die 6 at the inactive forward stroke of the latter.

While I have disclosed herein a particular machine and a particular method constituting practical and desirable examples embodying the invention, it is to be understood that such disclosure is intended to be illustrative, not restrictive, and that it is my purpose to claim the invention in whatever form its principle may be utilized.

I claim:

1. The method of die-forming a slug of metal into a capped nut blank, which comprises simultaneously displacing blank metal from opposite directions to form a bore in one end of the blank and a dome on the other end of the blank, and at the same time compelling the portion of the blank surrounding the mouth of the bore to assure a predetermined, non-cylindrical external configuration.

2. The method of die-forming a slug of metal into a capped nut blank, which comprises confining the blank in a unitary die having a bore therein of polygonal shape, and simultaneously applying bore-forming and dome-forming pressure from opposite ends of the blank to form a bore in the blank and a dome on the blank and to compel the blank metal which surrounds the mouth of the bore in the blank to assume the shape of the bore of the surrounding die.

3. The method of die-forming a slug of metal into a capped nut blank, which comprises placing the blank in a surrounding matrix die having a bore of non-cylindrical shape, and simultaneously die-forming an internal bore in the blank and an external dome on the blank by displacement of blank metal, while compelling the marginal base portion of the blank to assume the shape of the bore of the surrounding matrix die.

4. The method of die-forming a slug of metal into a capped nut blank, which comprises confining the blank in a unitary die having a bore therein of polygonal shape, applying preliminary compressive force to the blank to square the ends of the blank with reference to the axis of the bore, and then applying bore-forming and dome-forming pressure from opposite ends of the blank to form a bore in the blank and a dome on the blank and to compel the blank metal which surrounds the mouth of the bore in the blank to assume the shape of the bore of the surrounding die.

5. In a machine for die-forming capped nut blanks from slugs of metal, in combination, means for feeding a wire into the machine, means for severing a slug from the wire, a matrix die having a bore of non-cylindrical contour, means for placing the slug in the matrix die, and means for converting the slug into a capped nut blank at a single operation, comprising a dome-forming die, a bore-forming plunger, and means for operating said dome-forming die and bore-forming plunger against the blank simultaneously from opposite directions to compel the portion of the blank surrounding the mouth of the plunger-formed bore to assume an external configuration corresponding to that of the bore of the matrix die.

6. In a machine for die-forming capped nut blanks from slugs of metal, the combination with double-stroke header mechanism, of a matrix die, means for feeding wire in measured steps, means for severing a slug from the wire and transferring it into register with the matrix die, means for thrusting the slug into the matrix die, and means for converting the slug at a single operation into a capped nut blank having a dome at one end, an unthreaded bore in the other end, and a polygonal skirt portion surrounding the mouth of the bore.

7. In a machine for die-forming capped nut blanks from slugs of metal, the combination with double-stroke header mechanism, of a matrix die, means for feeding wire in measured steps, means for severing a slug from the wire and transferring it into register with the matrix die, means for thrusting the slug into the matrix die, and means for converting the slug at a single operation into a capped nut blank having a dome at one end, an unthreaded bore in the other end, and a polygonal skirt portion surrounding the mouth of the bore, and means for thereafter ejecting the finished blank from the matrix die.

8. In a machine for die-forming capped nut blanks from slugs of metal, the combination with a floatingly mounted matrix die having a non-cylindrical bore therein, of a dome-forming die engageable with the matrix die, a bore-forming plunger operable into the matrix die from the opposite direction, an unyieldingly supported sleeve surrounding the bore-forming plunger and surrounded by the matrix die, and means for driving the dome-forming die against the matrix die and simultaneously driving the bore-forming plunger axially into the bore of the matrix die.

9. In a machine for die-forming capped nut blanks from slugs of metal, in combination, die means defining a cavity which is of polygonal cross-section and which has a dome-shaped end, a bore-forming plunger mounted to be thrust axially into the cavity in a direction toward the dome-shaped end thereof, and means for thrusting the bore-forming plunger into a slug located in the cavity to form a bore in the slug and to displace the slug metal to an external configuration corresponding to that of the cavity.

10. In a machine for die-forming capped nut blanks from slugs of metal, in combination, a dome-forming plunger die having a forming cavity therein, a matrix die yieldingly supported against the thrust of the plunger die and having a bore therein of the same cross-sectional size and shape as the mouth of the forming cavity in the plunger die, an ejector sleeve disposed within the matrix die and forming a base for engaging and supporting a blank in opposition to the plunger die at the forming operation, a bore-forming plunger operable through the ejector sleeve, and means for driving the bore-forming plunger beyond the sleeve and into the blank in opposition to the plunger die as the plunger die advances.

11. A double-stroke header for die-forming capped nut blanks from slugs of metal, comprising a double-stroke plunger, a floating matrix die, preliminary and finishing dies operable respectively in line with the matrix die at alternate strokes of the plunger, a sleeve within the matrix die supporting the blank against the thrust of the plunger, a bore-forming plunger mounted in the sleeve, and means for projecting the bore-forming plunger beyond the sleeve and into the blank in opposition to the finishing die as the latter advances to form the blank.

12. A double-stroke header for die-forming capped nut blanks from slugs of metal, comprising a double-stroke plunger, a floating matrix die, preliminary and finishing dies operable respectively in line with the matrix die at alternate strokes of the plunger, a sleeve within the matrix die supporting the blank against the thrust of the plunger, a bore-forming plunger mounted in the sleeve, and means for projecting the bore-forming plunger beyond the sleeve and into the blank in opposition to the finishing die as the latter advances to form the blank, comprising a thrust pin mounted in the path of the preliminary die at the finishing stroke, and a lever operated by the thrust pin to move the bore-forming plunger toward the finishing die as the finishing die advances to form the blank.

13. In a machine for die-forming capped nut blanks from slugs of metal, in combination, a floating matrix die having a bore of non-cylindrical cross-section for receiving the blank, a bore-forming plunger within the matrix die, a dome-forming plunger die operable toward the matrix die, means for driving the dome-forming plunger against the blank, and means for simultaneously driving the bore-forming plunger into the blank from the opposite direction.

14. In a machine for die-forming capped nut blanks from slugs of metal, the combination with a stationary die block of a matrix die slidingly mounted therein, a die carrying plunger, preliminary and finishing plunger dies carried by the plunger and arranged to be advanced toward the matrix die at alternate advancing strokes of the plunger, a stationary base block mounted in the stationary die block, springs interposed between the base block and the matrix die for yieldingly opposing retreat of the matrix die in response to the thrust of the finishing plunger die, a guide bushing mounted in the base block and having a bore therein, a guide bushing cap secured to the guide bushing, a bore-forming plunger extending through the guide bushing cap and into the matrix die, a flange on the bore-forming plunger contained within the guide bushing bore, a piston operable in the guide bushing bore, a lever having one end thereof engaged with the piston, a pivotal support for the lever mounted in the die block and providing a fulcrum intermediate the ends of the lever, a thrust pin slidingly mounted in the die block in position to engage the opposite end of the lever, said thrust pin being mounted in position to be engaged and operated by the preliminary die at the finishing stroke of the plunger.

15. In a machine for die-forming capped nut blanks from slugs of metal, the combination with a stationary die block, of a shouldered die supporting sleeve mounted therein, a shouldered, floatingly mounted matrix die supported in said sleeve, said sleeve having a plurality of arcuate rabbets formed in the peripheral portion of its outer end, and headed screws threaded into the stationary die block and having the heads thereof disposed to extend into said arcuate rabbets to hold the sleeve against longitudinal and rotary movement.

HEYMAN ROSENBERG.